Oct. 8, 1968 R. A. HATHAWAY 3,404,895

PHONOGRAPH TONE ARM AND CARTRIDGE ASSEMBLY THEREFOR

Filed Aug. 25, 1965

INVENTOR.
Richard A. Hathaway

BY Francis W. Crotty

Attorney

United States Patent Office 3,404,895
Patented Oct. 8, 1968

3,404,895
PHONOGRAPH TONE ARM AND CARTRIDGE ASSEMBLY THEREFOR

Richard A. Hathaway, Des Plaines, Ill., assignor to Zenith Radio Corporation, Chicago, Ill., a corporation of Delaware Filed Aug. 25, 1965, Ser. No. 482,499
3 Claims. (Cl. 274—24)

ABSTRACT OF THE DISCLOSURE

There is described a floating cartridge support assembly which is extremely light in weight and thus especially suited for use in a low mass tone arm. The assembly comprises a cartridge including a record-tracking stylus and a bracket assembly for mounting the cartridge within a tone arm housing for pivotal movement about a substantially horizontal axis between a playing position in which the stylus projects below the confines of the housing to operatively engage a record and a non-playing, protective position in which the stylus recedes into the confines of the housing. A flexible cantilever member has a base portion coupled to the cartridge pivotal mounting member and a free end which engages the upper interior surface of the cartridge housing to exert a yieldable bias force to normally maintain the cartridge in its playing position but permits retraction of the cartridge to its non-playing position in response to a force in excess of the yieldable bias force.

The present invention relates generally to phonographs, and more particularly, to an improved tone arm and cartridge assembly therefor.

The advent of hi-fi and stereo recording practices has prompted research directed to producing continually more sophisticated apparatus for reproducing recorded information in a fidelity approaching its original quality while parallel and closely related efforts have been directed to protecting and prolonging the useful life of the expensive recordings and sensitive transducer elements used in such reproduction systems. Along these lines, stylus tracking pressures which are known to be inversely related to record life, have been reduced considerably in recent years to a point where they now are 2 grams and even less. Since transducers responding to such pressures are generally critically constructed and relatively fragile, it is vitally important to afford these devices protection from impacting or jarring. Periodic or continued impacting or jarring of the phonograph and/or of the cartridge often causes misalignment of the components thereof and/or damage to one or more styli, and generally promotes less than optimum performance of the cartridge with a corresponding loss in audio fidelity. Likewise, it is also desirable to afford protection for the expensive record discs from tone arm impacts, etc. which are likely to cause breakage, scratching, marring or alterations of the groove characteristics which make such records completely useless or at least not suitable for providing the desired high quality playback.

To satisfy the above requirements, a tone arm and cartridge assembly has been designed in which the cartridge and its associated stylus are mounted in a vertically compliant manner to the tone arm and adapted to move between a playing position in which the stylus engages the grooves of a record and a non-playing position in which the cartridge assembly is retracted into a recess in the tone arm or cartridge housing to prevent mutual impacting between the delicate cartridge assembly and the recording disc, the brunt of any impact being borne in this structure by a blunt and protectively padded forward portion of the housing. A particularly suitable tone arm and cartridge assembly of this type which has enjoyed extended commercial success is illustrated and claimed in Patent 3,074,726—Bauer et al., which is assigned to the same assignee as the present invention. The assembly illustrated therein not only accomplishes the aforesaid objectives but also provides effective isolation of the cartridge from spurious motion components imparted to the phonograph, and in particular to the tone arm, which motion components are caused by random vibration, instability in the mounting of the phonograph, shock excitation and other external forces. Further objects and advantages of the Bauer et al. design can be understood by reference to the aforesaid patent.

Although the cited patented structure has enjoyed considerable commercial success, it does have certain shortcomings especially for use in conjunction with a transducer element adapted to operate at extremely small tracking pressures. For example, the assembly is rather large and requires a correspondingly large tone arm cavity to contain it. The assembly is also somewhat expensive to construct and to assemble.

It is, therefore, an object of the present invention to provide a new and improved tone arm and cartridge assembly.

It is also an object of the invention to provide a tone arm and cartridge assembly which is light in weight and of economical construction.

It is a further object of the invention to provide a cartridge mounting structure which is capable of being quickly and easily fitted within the tone arm thereby facilitating production assembly thereof.

It is yet a further object of the invention to provide a floating type cartridge mounting assembly which exhibits the above discussed desirable characteristics.

Accordingly, the invention is directed generally to a tone arm and cartridge assembly comprising a tone arm supported at one end and including a cartridge housing at its opposite end which housing has a bearing surface. The assembly also comprises a cartridge including a record tracking stylus and there are means for mounting the cartridge within the housing for pivotal movement about a substantially horizontal axis between a playing position in which the stylus projects below the confines of the housing to operatively engage a record and a non-playing protective position in which the stylus recedes into the confines of the housing. A flexible cantilever member having a base portion coupled to the cartridge mounting means and a free end engaging the bearing surface of the tone arm is provided to exert a yieldable bias force for normally maintaining the cartridge in its playing position but for permitting retraction of the cartridge to its non-playing position in response to a force in excess of the yieldable bias force.

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

Figure 1:
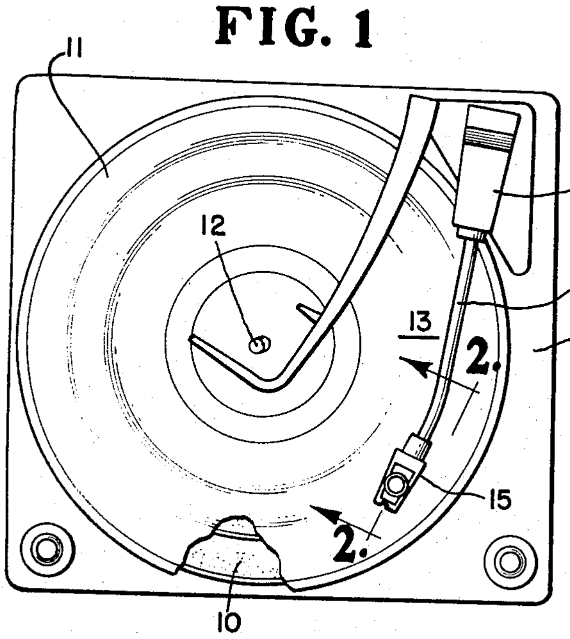
FIGURE 1 is a plan view of a phonograph and associated tone arm structure embodying the mounting assembly of the present invention.

Referring now to FIGURE 1, there is shown a substantially conventional phonograph having a base portion 9 provided with the usual control knobs, and a turntable 10 having a record 11 thereon which is driven at the required rotational speed about a central spindle 12 by an appropriate motor and gear mechanism, not shown. A tone arm assembly 13 is appropriately supported at one end for the necessary lateral and vertical movement by suitable means of conventional or convenient construction, not shown, but contained within enclosure 14. Housing 14 may also include, if desired, means for effectively counterbalancing the weight of the tone arm in an amount to establish a predetermined record tracking force. At its opposite or forward end, structure 13 bears a cartridge housing 15, the extreme portions of the tone arm being interconnected by tubular portion 17.

Figure 4:
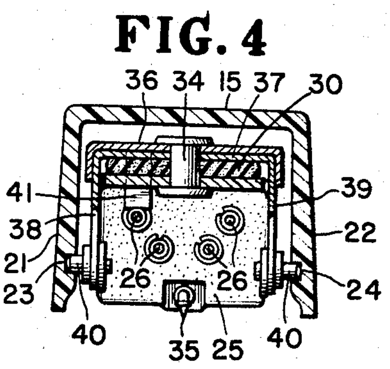
FIGURE 4 is a cross-sectional view taken along lines 4—4 of FIGURE 2.
Figures 2, 5:
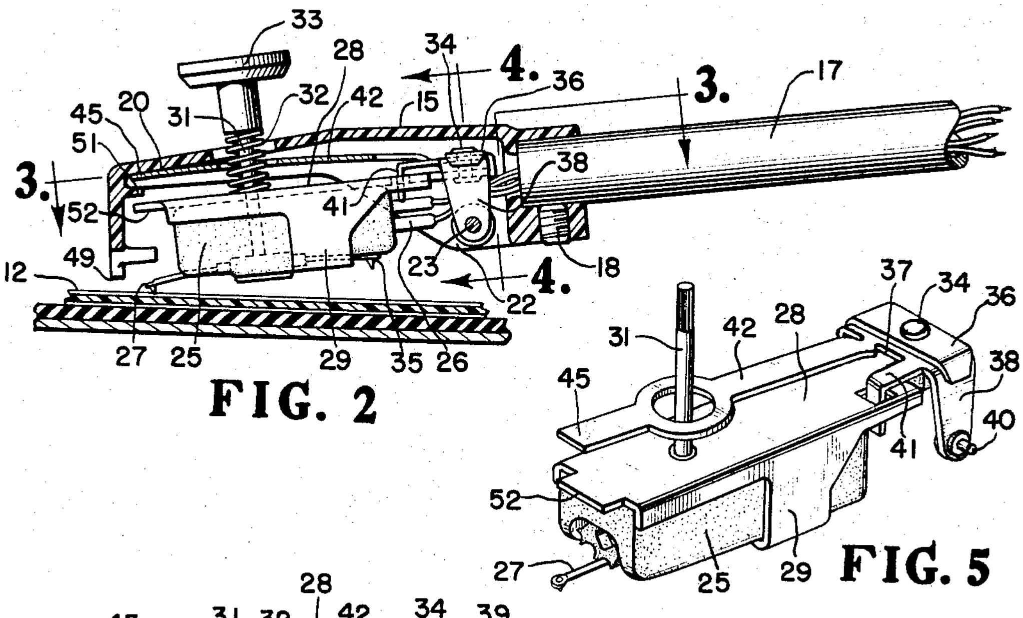
FIGURE 2 is an enlarged, cross-sectional, fragmentary view of the cartridge housing and support structure taken along lines 2—2 of FIGURE 1.
FIGURE 5 is a perspective view of the cartridge and mounting assembly withdrawn from the cartridge housing.
Figure 3:
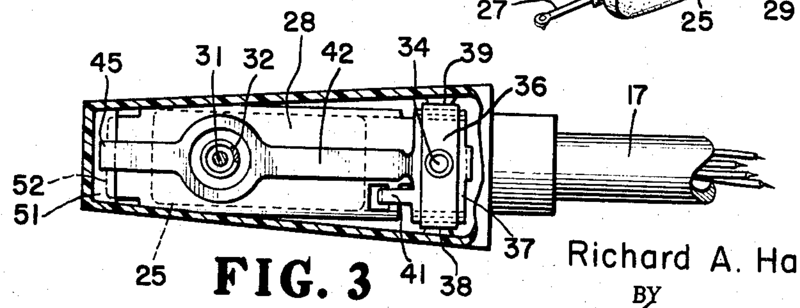
FIGURE 3 is a sectional plan view taken along lines 3—3 of FIGURE 2.

As shown in the detail view of FIGURE 2, section 17 of the tone arm terminates in an appropriate cylindrical recess in housing 15 and is held fast thereto by set screw 18. Housing 15 as shown in the several figures has a U-shaped cross-section which tapers toward the forward portion thereof, and sidewalls which are partially cut away, as seen in FIGURE 2, for aesthetic reasons and to minimize the mass of the housing. The specific contour and styling of the tone arm and cartridge assembly 13, and particularly that of housing 15, is of no essential moment to the invention and that shown is for illustrative purposes only. It is desirable, however, that the housing include a bearing surface, such as upper interior surface 20 thereof, and a pair of opposed sidewalls 21 and 22 with mounting provisions for the cartridge, such as respective bearing apertures 23 and 24 disposed therein as shown in FIGURE 4.

A cartridge 25 including electrical output terminals and leads 26 coupled through hollow tone arm section 17 to adequate amplifying and reproduction apparatus, not shown, and having a record tracking stylus 27 is mounted within housing 15 for pivotal movement about a substantially horizontal axis between a playing position in which the stylus projects below the confines of the housing to operatively engage record 12 as shown in FIGURE 2 and a non-playing position in which the stylus recedes into the confines of housing 15. Specifically, cartridge 25 is held by a bracket assembly 28 having depending, space opposed side portions 29 which terminate in folded portions (not fully shown) which are received in matching grooves on the underside of cartridge 25 thereby firmly holding the cartridge against longitudinal movement. Bracket 28 also includes a flat base portion extending rearwardly of the cartridge and parallel to the top surface thereof which portion has an aperture therein for permitting passage of a ground tab 41 for contacting one of leads 26.

The illustrated cartridge arrangement employs a turret type dual stylus assembly having a central shaft portion 31 extending through an aperture in the upper surface of housing 15 and terminating in a cap portion 33. The assembly is operative upon depression and rotation of cap 33 against the bias of spring 32 to rotate a reserve or 78 r.p.m. stylus 35 to the operative position occupied by stylus 27. However, here again, the particular construction of the cartridge, the associated stylus element or elements, and even of holding bracket 28 is not essential to the subject invention and may be of any construction not incompatible with the mechanism of the invention to be described. A particularly advantageous cartridge and holding bracket assembly therefor is shown in a concurrently filed application of Seymour Kessler, Ser. No. 482,403, and assigned to the same assignee as the present invention.

The cartridge mount further includes a bracket assembly having a U-shaped member 37 with legs 38, 39 depending from opposite ends of a base which overlies the rearward portion of holding bracket 28 but is isolated therefrom via intermediate vibration damping material 30. The length or bite of member 37 is less than the separation of housing walls 21, 22 as required to enable the cartridge with its mounting assembly to be releasably installed within housing 15. Member 37, or at least its depending legs 38 and 39, is formed of readily yieldable material and each of the legs carries near its free end mounting provisions, herein shown as outwardly facing pins 40 received by respective ones of the bearings 23 and 24 for mounting the cartridge within housing 15 for pivotal movement about a substantially horizontal axis between playing and non-playing positions. At this point it may be mentioned that the imposition of damping material 30 as a connective link between cartridge 25 and the tone arm has been found to substantially lessen the transmittal of extraneous and undesirable vibrations from the tone arm to the cartridge.

The playing and non-playing positions of the cartridge are established by an elongated flexible cantilever member 42 having a base portion coupled to, or, as shown, integral with member 37 of the cartridge mounting means. As best shown in FIGURE 4, the base portion of cantilever 42, and damping material 30 are firmly held to the rearward section of bracket 28 by a rivet 34 extending between the underside of member 28 and the upper surface of a stiffener plate 36 overlying member 37. The free end 45 of cantilever 42 engages upper bearing surface 20 of cartridge housing 15 to exert a predetermined bias force for normally maintaining the cartridge in its playing position but for permitting retraction of the cartridge to a non-playing position in response to a force in excess of the bias force. In this latter state, the cartridge and stylus lie entirely above a protective plane formed by the lower bounds of housing 15.

More particularly, the cantilever is fabricated to have a flexibility such that the reactive force exerted by member 42 on upper interior bearing surface 20 of the tone arm housing is sufficient to maintain the cartridge in its operating position shown in FIGURE 2 under the influence of normal force variations, such as caused by undulations in record 11 or other slight extraneous vibrations. However, member 42 is designed to yield under unusual forces to permit retraction of the cartridge within the confines of housing 15 thereby allowing only the blunt and preferably padded surface 49 of the front wall of tone arm housing 15 to contact the record surface. This, of course, not only protects the record, but also protects the delicate and fragile cartridge assembly. Further, in accordance with the invention, the reactive force exerted by the cantilever member is adjustable by bending the cantilever to define a steeper or shallower angle with holding bracket 28. This adjustment is preferably made prior to releasing the device to the consumer, but may be made by the user in a simple, expeditious manner, as by using the end of a pencil for either depressing member 42 with respect to bracket 28 or by inserting it underneath the member to urge it upward to increase its angle with respect thereto.

By way of illustration and in no sense by way of limitation, member 42 as currently produced is comprised of Phosphor bronze, 8 numbers hard, .004 inch thick, ⅛ inch wide throughout the bulk of its length but reduced to 1/16 inch near its base to provide increased flexibility. Of course, the O-shaped central portion of the member is solely to permit passage of turret shaft 31, and may be of the same straight contour as the rest of the member if the turret is omitted.

A bearing surface 51 immediately below and opposed to surface 20 is provided as an abutment to engage cantilever member 42 when the tone arm is lifted from the record surface thus precluding counterclockwise rotation of the cartridge about its axis more than a predetermined small amount. The underside of abutment 51 is also adapted to contact a forwardly protruding tab 52 of bracket 28 to prevent clockwise rotation of the cartridge to a point that may exceed the elastic limit of cantilever 42.

In accordance with another aspect of the invention, the cartridge assembly may be quickly and easily inserted into or removed from housing 15. This feature facilitates rapid production assembly of the unit and simplifies considerably replacement thereof. As is noted from FIGURE 4, the opposed sidewalls 21, 22 are spaced from each other by a predetermined distance which is less than the distance between the outward extremities of pins 40 of portions 38, 39 of member 37 in their unstressed condition. Because of the resilient characteristics of these portions, the assembly may be easily forced up along the lower contoured inner surface of the housing 15 (while simultaneously guiding member 42 into the archway formed between upper interior surface 20 and abutment 51 of housing 15) until the pins reach the bearing receptacles whereat they immediately snap to their home positions. The structure is now fully assembled. Also since spring means 42 is only affixed to the cartridge element and not in addition to housing 15, it is seen that the cartridge is easily withdrawn from its supported position by merely moving the resilient portions 38, 39 toward one another, while urging the cartridge in a downward direction. Of course, cantilever 42 is not indispensable to this feature of the invention. For example, any functional equivalent, as a coil spring, or some like resilient member, being affixed exclusively to either the cartridge element and its mount or to the housing and having its free end contact the other of these elements for biasing the cartridge to an appropriate float position, is adequate, although the illustrated structure is preferred. Further, it is understood that bearings 23, 24 and pins 40 could be interchanged, i.e., pins 40 being affixed to walls 38, 39 and bearings 23, 24 being established on respective opposed housing walls 21, 22 without departing from the invention.

Hence, a simple, economical, and novel assembly for pivotally mounting a phonograph cartridge to a tone arm has been shown. The structure has the virtue that it is small in size and sufficiently light in weight to fit within a small cartridge housing assembly 15 and to be compatible with the low mass requirements of modern tone arm structures. Further, the float position of the cartridge may be easily adjusted both at the factory and in the home by a simple expeditious operation, and the structure allows the cartridge to be inserted into and withdrawn from its supported position by the simple expedient of moving the resilient opposed portions of the mounting bracket toward one another.

While a particular embodiment of the invention has been shown and described, it will be obvious to those skilled in the art that changes and modifications may be made without departing from the invention in its broader aspects.

I claim:

1. A tone arm and cartridge assembly comprising:
a tone arm supported at one end and including a cartridge housing at its opposite end, said housing having a bearing surface;
a cartridge including a record-tracking stylus;
means for mounting said cartridge within said housing for pivotal movement about a substantially horizontal axis, displaced from the rearward end of said cartridge toward said one end of said tone arm, between a playing position in which said stylus projects below the confines of said housing to operatively engage a record and a non-playing position in which said stylus recedes into the confines of said housing;
and a cantilever-mounted elongated flexible flat spring member fixed to said cartridge mounting means and extending in alignment with said cartridge for its full length with a free end engaging said bearing surface of said housing at the forward end of said cartridge to exert a yieldable bias force for normally maintaining said cartridge in said playing position but for permitting retraction of said cartridge to said non-playing position in response to a force in excess of said yieldable bias force.

2. A tone arm and cartridge assembly comprising:
a tone arm supported at one end and including a cartridge housing at its opposite end, said housing including a pair of opposed sidewalls with bearings disposed therein and an interior bearing surface;
a cartridge including a record-tracking stylus;
a bracket assembly affixed to said cartridge having a portion extending rearwardly thereof and further having a pair of resilient space opposed ear portions individually including an outwardly facing pin received by a respective one of said bearings for mounting said cartridge to said tone arm for pivotal movement about a substantially horizontal axis between a playing position in which said stylus projects below the confines of said housing to operatively engage a record and a non-playing position in which said stylus recedes into the confines of said housing;
an elongated flexible cantilever member having a base portion affixed to said rearwardly extending portion of said bracket assembly and a free end engaging said bearing surface of said tone arm for normally maintaining said cartridge in said playing position but for permitting retraction of said cartridge to said non-playing position;
and damping means in series in the acoustic path between said tone arm and said cartridge for substantially suppressing the transmittal of vibrations from said tone arm to said cartridge.

3. A tone arm and cartridge assembly comprising:
a tone arm supported at one end and movable about said supported end between record playing and non-playing positions;
a cartridge housing at the opposite end of said tone arm including upper and lower opposed bearing surfaces and a pair of opposed sidewalls having bearings disposed therein;
a cartridge including a record-tracking stylus;
a mount for said cartridge comprising a bracket assembly having resilient space opposed ear portions individually including an outwardly facing pin received by a respective one of said bearings for mounting said cartridge within said housing for pivotal movement about a substantially horizontal axis between a playing position in which said stylus projects below the confines of said housing to operatively engage a record and a non-playing position in which said stylus recedes into the confines of said housing;
and an elongated flexible cantilever member having a base portion coupled to said cartridge mount and a free end disposed between said upper and lower bearing surfaces of said cartridge housing and engaging said upper bearing surface for normally maintaining said cartridge in said playing position, but for permitting retraction of said cartridge to said non-playing position, said cantilever member engaging said lower bearing surface when said tone arm is lifted from said record for precluding counterclockwise rotation of said cartridge about said horizontal axis more than a predetermined small amount.

References Cited

UNITED STATES PATENTS

| | | | |
|---|---|---|---|
| 3,273,897 | 9/1966 | Farrington et al. | 274—24 |
| 2,582,948 | 1/1952 | Cairnes | 274—1 |

LEONARD FORMAN, *Primary Examiner.*

FELIX J. D'AMBROSIO, *Assistant Examiner.*